(12) United States Patent
Yu

(10) Patent No.: US 11,158,859 B2
(45) Date of Patent: Oct. 26, 2021

(54) POSITIVE ELECTRODE CURRENT COLLECTOR, POSITIVE ELECTRODE PLATE, ELECTROCHEMICAL DEVICE, AND ELECTRIC EQUIPMENT COMPRISING THE ELECTROCHEMICAL DEVICE

(71) Applicant: Contemporary Amperex Technology Co., Limited, Ningde (CN)

(72) Inventor: Yang Yu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/149,736

(22) Filed: Jan. 15, 2021

(65) Prior Publication Data

US 2021/0143436 A1 May 13, 2021

Related U.S. Application Data

(63) Continuation of application No. PCT/CN2020/086974, filed on Apr. 26, 2020.

(30) Foreign Application Priority Data

May 24, 2019 (CN) .......................... 201910441399.X

(51) Int. Cl.
*H01M 4/66* (2006.01)
*H01M 4/62* (2006.01)

(52) U.S. Cl.
CPC ........... *H01M 4/661* (2013.01); *H01M 4/623* (2013.01); *H01M 4/663* (2013.01)

(58) Field of Classification Search
None
See application file for complete search history.

(56) References Cited

U.S. PATENT DOCUMENTS

2013/0295458 A1* 11/2013 Yokouchi ............... H01G 11/26
429/211
2014/0170454 A1* 6/2014 Kwon ................. H01M 10/058
429/94

(Continued)

FOREIGN PATENT DOCUMENTS

CN  1311903 A  9/2001
CN  1622366 A  6/2005

(Continued)

OTHER PUBLICATIONS

PCT International Search Report for PCT/CN2020/086974, dated Jul. 29, 2020, 15 pages.

(Continued)

*Primary Examiner* — Ula C Ruddock
*Assistant Examiner* — Tony S Chuo
(74) *Attorney, Agent, or Firm* — Law Offices of Liaoteng Wang

(57) ABSTRACT

The present application discloses a positive electrode current collector, a positive electrode plate, an electrochemical device, and an electric equipment including the electrochemical device. The positive electrode current collector includes: a metal conductive layer; an overcharge blocking activation layer disposed on a surface of the metal conductive layer, the overcharge blocking activation layer including an overcharge blocking activation material, a binder material and a conductive material, wherein the overcharge blocking activation material includes an esterified saccharide.

17 Claims, 4 Drawing Sheets

(56) References Cited

U.S. PATENT DOCUMENTS

2018/0294472 A1    10/2018  Fan
2019/0081304 A1    3/2019   Morin et al.

FOREIGN PATENT DOCUMENTS

| CN | 103280597 A | 9/2013 | | |
|---|---|---|---|---|
| CN | 104409681 A | 3/2015 | | |
| CN | 106390200 A | 2/2017 | | |
| CN | 106910897 A | 6/2017 | | |
| CN | 107437622 A | 12/2017 | | |
| CN | 107565137 A | 1/2018 | | |
| CN | 109755462 A | 5/2019 | | |
| CN | 110265665 A | 9/2019 | | |
| EP | 0932212 A1 | 7/1999 | | |
| JP | 2003123724 A | 4/2003 | | |
| JP | 2011192568 A | 9/2011 | | |
| JP | 2016076439 A | 5/2016 | | |
| WO | WO 2011/030626 A1 * | 3/2011 | ............. | H01M 4/66 |
| WO | WO2018147390 A1 | 8/2018 | | |
| WO | WO2019091392 A1 | 5/2019 | | |

OTHER PUBLICATIONS

The First Official Action and search report dated May 20, 2020 for Chinese application No. 201910441399.X, 11 pages.
The Notice of Allowance and Supplementary search report dated Sep. 3, 2020 for Chinese application No. 201910441399.X, 6 pages.
The Extended European Search Report for European Application No. 20814019.4, dated Sep. 6, 2021, 8 pages.

* cited by examiner

US 11,158,859 B2

POSITIVE ELECTRODE CURRENT COLLECTOR, POSITIVE ELECTRODE PLATE, ELECTROCHEMICAL DEVICE, AND ELECTRIC EQUIPMENT COMPRISING THE ELECTROCHEMICAL DEVICE

CROSS-REFERENCE TO RELATED APPLICATION

This application is a continuation of International Application No. PCT/CN2020/086974, filed on Apr. 26, 2020, which claims priority to Chinese Patent Application No. 201910441399.X filed on May 24, 2019, both of which are hereby incorporated by reference in their entireties.

TECHNICAL FIELD

This application belongs to the technical field of energy storage devices, and specifically relates to a positive electrode current collector, a positive electrode, an electrochemical device, and electric equipment comprising the electrochemical device.

BACKGROUND

Electrochemical devices with lithium ion secondary batteries as representatives mainly rely on the back-and-forth migration of active ions between positive electrode active material and negative electrode active material for charging and discharging. Electrochemical devices can provide stable voltage and current during use, and are green and environmentally friendly during use, so they are widely used in various electric equipment, such as mobile phones, tablet computers, notebook computers, electric bicycles, electric cars, etc.

While electrochemical devices benefit mankind, their safety issues such as fires and explosions during charging process also occur from time to time, which poses a great threat to people's lives and property safety. Therefore, how to improve the overcharge safety performance of electrochemical device has become an urgent technical problem to be solved.

SUMMARY

A first aspect of the present application provides a positive electrode current collector including: a metal conductive layer; an overcharge blocking activation layer disposed on surface of the metal conductive layer, the overcharge blocking activation layer including an overcharge blocking activation material, a binder material and a conductive material, wherein the overcharge blocking activation material includes an esterified saccharide.

A second aspect of the present application provides a positive electrode plate including the positive electrode current collector according to the first aspect of the present application; a positive electrode active material layer disposed on surface of the overcharge blocking activation layer facing away from the metal conductive layer.

A third aspect of the present application provides an electrochemical device including the positive electrode plate according to the second aspect of the present application, a negative electrode plate, and a separator.

A fourth aspect of the present application provides electric equipment including the electrochemical device according to the third aspect of the present application.

Compared with the prior art, the present application has at least the following beneficial effects:

By using the positive electrode current collector provided in embodiments of the application, including a metal conductive layer and an overcharge blocking activation layer disposed on surface of the metal conductive layer, the overcharge blocking activation layer including an esterified saccharide overcharge blocking activation material, in case an electrochemical device including the positive electrode current collector is overcharged, the charging current can be cut off in time, effectively preventing the electrochemical device from thermal runaway and avoiding safety problems such as fire and explosion, and thus improving the overcharge safety performance of the electrochemical device. The electric equipment of the present application includes said electrochemical device, and thus has at least the same advantages as the electrochemical device.

DESCRIPTION OF THE DRAWINGS

In order to explain the technical solutions of the embodiments of the present application more clearly, the following will briefly introduce the drawings that need to be used in the embodiments of the present application. A person of ordinary skill in the art can obtain other drawings based on these drawings without creative work.

DETAILED DESCRIPTION

In order to make the purpose, technical solutions, and beneficial technical effects of the present application clearer, the present application will be further described in detail below in conjunction with embodiments. It should be understood that the embodiments described in this specification are only for explaining the application, not intending to limit the application.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value or combined with other lower or upper limits to form a range that is not explicitly specified.

In the description herein, it should be noted that, unless otherwise specified, a numeric range described with the term "above" or "below" includes the lower or upper limit itself, and "more" in "one or more" means two or more.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

Positive Electrode Current Collector

Embodiments of the present application provide a positive electrode current collector that can improve overcharge safety performance of an electrochemical device.

Figure 1:
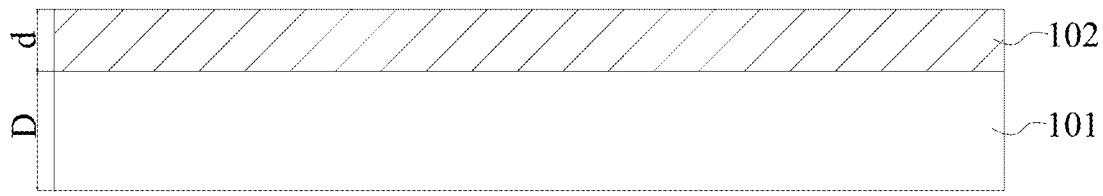
FIG. 1 is a schematic diagram of structure of a positive electrode current collector according to an embodiment of the present application.
Figure 2:
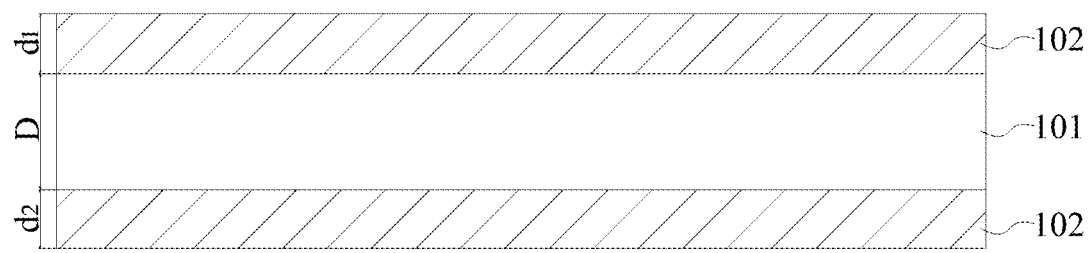
FIG. 2 is a schematic diagram of structure of a positive electrode current collector according to another embodiment of the present application.

FIG. 1 and FIG. 2 provide examples of a positive electrode current collector 10, respectively. Referring to FIG. 1 and FIG. 2, the positive electrode current collector 10 comprises a metal conductive layer 101 and an overcharge blocking activation layer 102 disposed on surface of the metal conductive layer 101. As an example, the overcharge blocking activation layer 102 may be disposed on any one of two opposite surfaces of the metal conductive layer 101 in its thickness direction (see FIG. 1), or on both of two opposite surfaces of the metal conductive layer 101 (see FIG. 2).

The overcharge blocking activation layer 102 comprises an overcharge blocking activation material, a binder material and a conductive material, wherein the overcharge blocking activation material includes an esterified saccharide.

In positive electrode current collector 10 of embodiments of the present application, the overcharge blocking activation layer 102 is disposed on surface of the metal conductive layer 101, and comprises an esterified saccharide overcharge blocking activation material, a binder material and a conductive material. Under normal working environment of an electrochemical device, physical and chemical properties of the esterified saccharide overcharge blocking activation material are stable, and the conductive material forms a continuous conductive network, so that the overcharge blocking activation layer 102 has a relatively small resistance, ensuring good electrical conductivity of the positive electrode current collector 10. When the electrochemical device is overcharged, esterified saccharide overcharge blocking activation material can undergo a chemical reaction under high temperature ($\geq 60°$ C.) and high voltage ($\geq 4.8V$, relative to lithium metal potential), resulting in changes in the physical structure of the material. This will cause the conductive material particles in the overcharge blocking activation layer 102 to separate, lead to the broken and destroyed conductive network, so that the resistance of the overcharge blocking activation layer 102 will increase sharply. As a result, the charging current is cut off in time, effectively preventing the electrochemical device from thermal runaway, avoiding safety problems such as fire and explosion, and thus improving the overcharge safety performance of the electrochemical device.

The overcharge blocking activation layer 102 achieves the purpose of disconnecting the conductive network and cutting off the charging current by the way that is different from volume expansion due to the crystallinity change of the overcharge blocking activation material at high temperature. The overcharge blocking activation layer 102 has relatively high reliability, because as long as the temperature and voltage of the overcharge blocking activation layer 102 reach the above-mentioned threshold (i.e. the temperature of $\geq 60°$ C.; the voltage of $\geq 4.8V$, relative to the lithium metal potential), the overcharge blocking activation layer 102 undergoes rapid chemical reaction, causing the broken and destroyed conductive network, so that charging current is cut off in time. In contrast, only physical changes occur under high temperature, for materials that change in crystallinity to cause volume expansion. The physical changes are greatly influenced by the preparation process of material coating and the preparation process of the electrochemical device. For example, crystallinity of materials are influenced by the temperature and coating speed of the preparation process of material coating, the electrolyte in the electrochemical device, and the like. These influences are uncontrollable. When an electrochemical device is overcharged, the material is probably not activated, so that the charging current cannot be cut off in time, causing potential safety hazard.

Preferably, esterified saccharide has an ester group on saccharide ring (or sugar ring). In other words, more than one secondary hydroxyl group on saccharide ring of the saccharide is esterified. After intensive and long term research, the inventor has found that compared with a saccharide having an ester group in side chain of saccharide ring, an esterified saccharide having an ester group on saccharide ring has high response sensitivity to high temperature ($\geq 60°$ C.) and high voltage ($\geq 4.8V$, relative to lithium metal potential), so that the overcharge blocking activation layer 102 can respond rapidly and cut off charging current, thereby better improving the overcharge safety performance of the electrochemical device.

In the positive electrode current collector 10 of embodiments of the present application, the esterified saccharide may be one or more of mono-esterified esterified saccharide and poly-esterified saccharide. Mono-esterified esterified saccharide, that is, mono-esterified products of saccharide, refers to a product in which a hydrogen atom of one hydroxyl group in saccharide is replaced by an acyl group, and preferably includes a product in which a hydrogen atom of one secondary hydroxyl group on saccharide ring in saccharide is replaced by an acyl group. Poly-esterified saccharide, that is, poly-esterified products of saccharide, refers to a product in which hydrogen atoms of two or more hydroxyl groups in saccharide are replaced by acyl groups, and preferably the product has ester group on saccharide ring.

In some preferred embodiments, the esterified saccharide includes an esterification product of saccharide in which two or more hydroxyl groups are esterified and a predetermined amount of hydroxyl groups are retained. The residual hydroxyl groups in the esterified saccharide may promote the activation of the esterified saccharide overcharge blocking activation material under a condition of a high temperature and a high voltage and thus block overcharging current in time, thereby improving overcharging safety performance and reliability. Further, the hydroxyl groups in the above mentioned predetermined amount include hydroxyl groups on saccharide ring.

After mono-esterification or poly-esterification, saccharide forms saccharide moiety of the esterified saccharide. Saccharide may be one or more of monosaccharides, oligosaccharides, polysaccharides, amino sugars, sugar alcohols, deoxysugars, and uronic acids. For example, saccharide is one or more of monosaccharides, oligosaccharides, and polysaccharides. For examples, saccharide is one or more of oligosaccharides, and polysaccharides.

Monosaccharides include, for example, one or more of ribose, xylose, galactose, mannose, glucose, and fructose.

Oligosaccharides comprises from 2 to 10 monosaccharide units, for example includes one or more of maltose, lactose, sucrose, cello-oligosaccharides with a degree of polymerization of 2 to 10, maltotriose, maltotetraose, maltopentaose, maltohexaose, isomaltose, isomaltotriose, panose, mannotriose, and cyclodextrin containing less than or equal to 10 monosaccharide units. Cyclodextrin containing less than or equal to 10 monosaccharide units is for example α-cyclodextrin, β-cyclodextrin, and γ-cyclodextrin.

Polysaccharides comprises more than 10 monosaccharide units, preferably more than 10 and less than or equal to 500 monosaccharide units. Polysaccharides includes, for example, one or more of starch, cellulose, chitosan, and cyclodextrin containing more than 10 monosaccharide units.

Amino sugars are for example saccharides obtained by replacing part of hydroxyl groups of the above-mentioned monosaccharides, oligosaccharides, and polysaccharides with amino groups. The above-mentioned part of hydroxyl groups has a number of greater than or equal to 1 groups.

Sugar alcohols are for example sorbitol, mannitol, maltitol, lactitol, xylitol, and the like.

Deoxysugars are for example saccharides obtained by replacing part of hydroxyl groups of the above-mentioned monosaccharides, oligosaccharides, and polysaccharides with hydrogen atoms. The above-mentioned part of hydroxyl groups has a number of greater than or equal to 1 groups.

Uronic acids are for example saccharides obtained by oxidizing primary hydroxyl groups of the above-mentioned monosaccharides, oligosaccharides, and polysaccharides with carboxyl groups.

In some preferred embodiments, the saccharide is selected from one or more of glucose, cello-oligosaccharides, cyclodextrin, cellulose and chitosan. More preferably, the saccharide is selected from one or more of glucose, cello-oligosaccharides with a degree of polymerization of 2 to 10, cyclodextrins containing 6 to 10 monosaccharide units, celluloses with a degree of polymerization of 10 to 500, and chitosans with a degree of polymerization of 10 to 500.

In some preferred embodiments, the acyl group preferably includes one or more of acyl groups represented by Formula 1 to Formula 6:

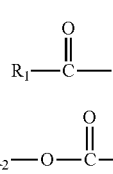

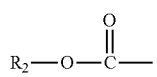

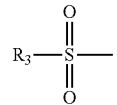

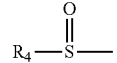

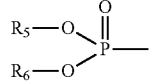

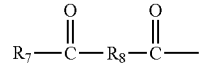

wherein $R_1$, $R_2$, $R_3$, $R_4$, $R_5$, $R_6$, and $R_7$ are independently hydrogen atom, unsaturated aliphatic group, saturated aliphatic group or aromatic group, $R_8$ is $-(CH_2)_n-$, and $0 \leq n \leq 8$.

Unsaturated aliphatic group comprises chain unsaturated aliphatic group, cyclic aliphatic groups, such as chain or cyclic alkenyl groups with 2 to 12 carbon atoms, chain or cyclic alkynyl groups with 2 to 12 carbon atoms. For example, unsaturated aliphatic group is selected from one or more of ethenyl, 1-propenyl, 2-methylpropenyl, 1-butenyl, 2-butenyl, 3-butenyl, 1-propynyl, 2-propynyl, cyclobutenyl, cyclopentenyl, cyclohexenyl.

Saturated aliphatic group comprises chain saturated aliphatic group, cyclic saturated aliphatic group. The chain saturated aliphatic group is for example straight or branched chain alkyl group with 1 to 12 carbon atoms, such as selected from one or more of methyl, ethyl, propyl, isopropyl, butyl, isobutyl, pentyl, isopentyl, hexyl and the isomers thereof. The cyclic saturated aliphatic group is for example a cyclic alkyl group having 3 to 15 carbon atoms, with or without a side chain, such as selected from one or more of cyclopropyl, cyclobutyl, cyclopentyl, cyclohexyl.

Aromatic group is for example selected from one or more of 1-benzyl, 1-phenethyl and the like.

In Formula 6, n is for example 1, 2, 3, 4, 5, or 6.

In some preferred embodiments, the acyl group is selected from one or more of Formula 1, Formula 2 and Formula 5. The acyl group is more preferably Formula 2, that is, carbonate esterified saccharides are preferred. Further, $R_1$ is selected from one or more of methyl, ethyl, propyl, and isopropyl, and $R_2$, $R_5$, and $R_6$ are each independently a hydrogen atom, methyl, ethyl, propyl, or isopropyl. The esterified saccharide having these acyl groups have better reactivity under high temperature ($\geq 60°$ C.) and high voltage ($\geq 4.8$V, relative to lithium metal potential), and higher response sensitivity when electrochemical device is overcharged, so that the overcharge blocking activation layer 102 responds rapidly and cuts off charging current, thereby further improving the overcharge safety performance of the electrochemical device.

Donor of the acyl group may be the corresponding carboxylic acids, oxygen-containing inorganic acids, acid halides, acid anhydrides, carbonates, sulfonates or phosphates. Acid halide is, for example, an acid chloride. By controlling molar ratio of saccharides reaction substrate and the donor of acyl group, it may be generally ensured that a predetermined amount of hydroxyl groups are retained on saccharide ring of esterified saccharide.

In some preferred embodiments, the overcharge blocking activation material may comprise one or more of polyesterification products of monosaccharides, polyesterification products of oligosaccharides and polyesterification products of polysaccharides. Further, the overcharge blocking activation material may include one or more of polyesterified products of oligosaccharides and polyesterified products of polysaccharides. Yet further, the polyesterification products are preferably carbonates. Furthermore, the polyesterification product contains a predetermined amount of hydroxyl groups on saccharide ring.

As an example, the overcharge blocking activation material may be selected from one or more of glucose pentaacetate, ethyl ester of glucose-1,6-diphosphate (for example, glucose-1,6-di(ethyl phosphate)), methyl ester of glucose-1, 6-dicarbonate (for examples, glucose-1,6-di(methyl carbonate)), β-cyclodextrin acetate, β-cyclodextrin carbonate, β-cyclodextrin phosphate, cellulose methyl carbonate, cellulose ethyl carbonate, cellulose methyl phosphate, cellulose ethyl phosphate, chitosan methyl carbonate, chitosan ethyl carbonate, chitosan methyl phosphate, and chitosan ethyl phosphate.

The binder material in the overcharge blocking activation layer 102 may be a binder material with good high temperature resistance. The binder material preferably comprises one or more of polyvinylidene fluoride (PVDF), vinylidene fluoride-hexafluoropropylene copolymer (PVDF-HFP), polyurethane, polyacrylonitrile (PAN), polyimide (PI), epoxy resin, organic silicone resin, ethylene-vinyl acetate copolymer (EVA), styrene-butadiene rubber (SBR), styrene-acrylic rubber, polyacrylic acid (PAA), acrylic acid-acrylate copolymer, and ethylene-acrylate copolymer (EMA). The binder material has relatively high thermal stability, which is beneficial to improve the stability of the overcharge blocking activation layer 102 during the normal operation of electrochemical device; and it can ensure high binding force between the overcharge blocking activation layer 102 and the metal conductive layer 101.

The conductive material in the overcharge blocking activation layer 102 may comprise one or more of metal conductive materials, carbon-based conductive materials, and conductive polymer materials.

Metal conductive materials comprise, for example, one or more of aluminum, aluminum alloy, copper, copper alloy, nickel, nickel alloy, titanium, and silver.

Carbon-based conductive materials comprise, for example, one or more of Ketjen black, mesophase carbon microspheres, activated carbon, graphite, conductive carbon black, acetylene black, carbon fiber, carbon nanotube, and graphene.

Conductive polymer materials comprise, for example, one or more of polysulfur nitrides, aliphatic conjugated polymers, aromatic ring conjugated polymers, and aromatic heterocyclic conjugated polymers. The aliphatic conjugated polymer is, for example, polyacetylene. The aromatic ring conjugated polymer is, for example, one or more of polyphenylene, polynaphthalene. The aromatic heterocyclic conjugated polymer is, for example, one or more of polypyrrole, polyacetylene, polyaniline, polythiophene, and polypyridine. Conductivity of the conductive polymer material may also be improved by doping modification.

In some preferred embodiments, in the overcharge blocking activation layer 102, mass percentage of the overcharge blocking activation material is from 25% to 45%, mass percentage of the binder material is from 35% to 60%, and mass percentage of the conductive material is from 6% to 20%. Such overcharge blocking activation layer 102 has a low resistance and can effectively improve the overcharge safety performance of the electrochemical device.

More preferably, in the overcharge blocking activation layer 102, mass percentage of the overcharge blocking activation material is from 30% to 40%, mass percentage of the binder material is from 45% to 55%, and mass percentage of the conductive material is from 6% to 10%.

In some preferred embodiments, the overcharge blocking activation layer 102 may also comprise auxiliary materials. The auxiliary materials are materials that have good affinity with the overcharge blocking activation material, the binder material, and the conductive material. The auxiliary materials may improve the compatibility and affinity of the overcharge blocking activation material, the binder material and the conductive material with each other, thereby improving the uniformity of dispersion of the overcharge blocking activation material and the conductive material in the binder material, and the flatness of the overcharge blocking activation layer 102, and reducing the defects such as pits in the layer. This may improve the overall protection of the overcharge blocking activation layer 102. When electrochemical device is overcharged, the overcharge blocking activation material will respond at any point of the positive electrode current collector 10, preventing potential safety hazard caused by leakage of electricity between the positive electrode active material layer 20 (see FIG. 3 to FIG. 5) and the metal conductive layer 101. In addition, the overcharge blocking activation material and the conductive material are uniformly dispersed in the binder material, so that the conductive material forms a uniform and continuous conductive network, ensuring relatively low resistance of the overcharge blocking activation layer 102 during normal charging and discharging and relatively good performance (such as cycle performance) of the electrochemical device.

The auxiliary materials preferably comprise one or more of sodium carboxymethyl cellulose (CMC-Na), silane coupling agents (such as vinyltrimethoxysilane), titanate coupling agents, organopolysiloxanes, higher alcohol fatty acid ester complex, polyoxyethylene polyoxypropylene pentaerythritol ether, polyoxyethylene polyoxypropanol amine ether, polyoxypropylene glycerol ether and polyoxypropylene polyoxyethylene glycerol ether. Titanate coupling agent is, for example, di(dioctylpyrophosphato) ethylene titanate. The organopolysiloxane is, for example, emulsified silicone oil, or polydimethylsiloxane. In some embodiments, the auxiliary materials comprises vinyl trimethoxysilane and/or polyoxypropylene glycerol ether.

In the overcharge blocking activation layer 102, mass percentage of the auxiliary materials is preferably from 1 to 10%, more preferably from 2% to 8%, for example 5%.

In some embodiments, the overcharge blocking activation layer 102 comprises 3% of vinyltrimethoxysilane and 2% of polyoxypropylene glycerol ether.

In some embodiments, the overcharge blocking activation layer 102 may be only disposed on one single surface of the metal conductive layer 101. In these embodiments, the overcharge blocking activation layer 102 has a thickness of preferably from 0.3 μm to 10 μm, that is, d=0.3 μm-10 μm. The overcharge blocking activation layer 102 having a thickness within the above range can lead to relatively small internal resistance of the positive electrode current collector 10, and can effectively improve the overcharge safety performance of electrochemical device. In addition, the overcharge blocking activation layer 102 having a thickness within the above range also helps to ensure relatively small volume and weight of electrochemical device, so that the electrochemical device has higher volume energy density and higher weight energy density. Further, d may be from 2 µm to 7 µm. Yet further, d may be from 3 µm to 5 µm.

In some embodiments, the overcharge blocking activation layer 102 may be disposed on both of two opposite surfaces of the metal conductive layer 101 in its thickness direction. Total thickness of the overcharge blocking activation layer 102 on both surfaces of the metal conductive layer 101 is from 0.5 µm to 18 µm. The overcharge blocking activation layer 102 has a thickness on each surface of greater than or equal to 0.25 µm, that is, $d_1+d_2=0.5$ µm~18 µm, $d_1 \geq 0.25$ µm, and $d_2 \geq 0.25$ µm. The overcharge blocking activation layer 102 having a thickness within the above ranges can lead to relatively small internal resistance of the positive electrode current collector 10, and can effectively improve the overcharge safety performance of electrochemical device. In addition, the overcharge blocking activation layer 102 having a thickness within the above ranges also helps to ensure relatively small volume and weight of electrochemical device, so that the electrochemical device has a higher volume energy density and a higher weight energy density.

In some optional embodiments, 0.25 µm≤$d_1$≤10 µm; 0.25 µm≤$d_2$≤10 µm. Preferably, 2 µm≤$d_1$≤7 µm; 2 µm≤$d_2$≤7 µm.

In some preferred embodiments, the overcharge blocking activation layers 102 comprising an overcharge blocking activation material are disposed on all of the surfaces of metal conductive layer 101 that require disposing positive electrode active material layer 20. This may achieve higher repeatability and reliability of current blocking effect while further improving the overcharge safety performance of the electrochemical device.

In embodiments of the present application, the thickness D of the metal conductive layer 101 is not particularly limited, and can be determined according to actual requirements. For example, D=1 µm~20 µm, such as D=8 µm~15 µm.

In the positive electrode current collector 10 of the present application, the metal conductive layer 101 may be a metal foil or a metal plate with good electrical conductivity and mechanical properties. The metal conductive layer 101 may comprise one or more of aluminum, aluminum alloy, nickel, nickel alloy, titanium, titanium alloy, silver, and silver alloy, and preferably comprise one or more of aluminum and aluminum alloy. Weight percentage of aluminum element in the aluminum alloy is preferably from 80% to 100%, and more preferably 90% or more. The aluminum alloy is, for example, aluminum-zirconium alloy.

In some preferred embodiments, the metal conductive layer 101 may be aluminum foil.

Next, the embodiments of the present application provide a method for preparing the positive electrode current collector 10, by which any one of the above-mentioned positive electrode current collectors 10 can be prepared. The method comprises a step S100 of preparing an overcharge blocking activation layer slurry and a step S200 of preparing a current collector.

S100 comprises dispersing an overcharge blocking activation material, a binder material and a conductive material in a solvent in accordance with a preset weight ratio to form a uniform overcharge blocking activation layer slurry.

In the step S100 of preparing an overcharge blocking activation layer slurry, the overcharge blocking activation material, the binder material and the conductive material may be described above, which will not be repeated here. The solvent is, for example, N-methylpyrrolidone (NMP).

The above mentioned auxiliary materials may also be added into the overcharge blocking activation layer slurry. The auxiliary materials may improve the compatibility of the overcharge blocking activation material, the binder material and the conductive material with each other, and provide a defoaming effect, thereby improving the dispersion of the overcharge blocking activation material and the conductive material in the binder material and forming a more stable slurry. The auxiliary materials may also promote full spread of the slurry on the surface of the metal conductive layer, improve flatness of the overcharge blocking activation layer, and reduce defects such as pits in the layer. The overall protective effect of the overcharge blocking activation layer is improved, so that when the electrochemical device is overcharged, the overcharge blocking activation material will respond at any point of the positive electrode current collector, preventing potential safety hazard caused by leakage of electricity. In addition, the overcharge blocking activation material and the conductive material are uniformly dispersed in the bonding material, so that the conductive material forms a uniform and continuous conductive network, ensuring relatively small resistance of the overcharge blocking activation layer during normal charging and discharging process and relatively good performance of the electrochemical device.

A mixer may be used to mix the materials. The materials are mixed evenly by stirring to form a uniform slurry. The mixer may be a known mixer for mixing materials, such as a planetary mixer.

Further, vacuum degassing method may be used to eliminate bubbles in the slurry, further improving the flatness of the overcharge blocking activation layer, and reducing defects such as pits in the layer.

S200 comprises coating surface of the metal conductive layer with the overcharge blocking activation layer slurry, and drying to form an overcharge blocking activation layer, to give a positive electrode current collector.

In step S200, coating methods known in the art may be used to sufficiently coat the surface of the metal conductive layer with the overcharge blocking activation layer slurry. For example, coating with higher uniformity may be obtained by using a gravure or micro-gravure coater.

In step S200, the drying may be natural air drying, infrared drying, or blast heating and drying at a temperature of 40° C. to 120° C. For example, drying may be carried out under hot air at from 60° C. to 80° C.

Positive Electrode Plate

Embodiments of the present application provide a positive electrode plate. The positive electrode plate comprises the positive electrode current collector 10 according to the embodiments of the present application, and a positive electrode active material layer 20 disposed on the positive electrode current collector 10. By using the positive electrode current collector 10 according to the embodiments of the present application, the positive electrode plate thus has the corresponding advantages.

The positive electrode plate of the embodiments of the present application comprises positive electrode current collector 10 and a positive electrode active material layer 20 disposed on at least one surface of the positive electrode current collector 10.

Figure 3:
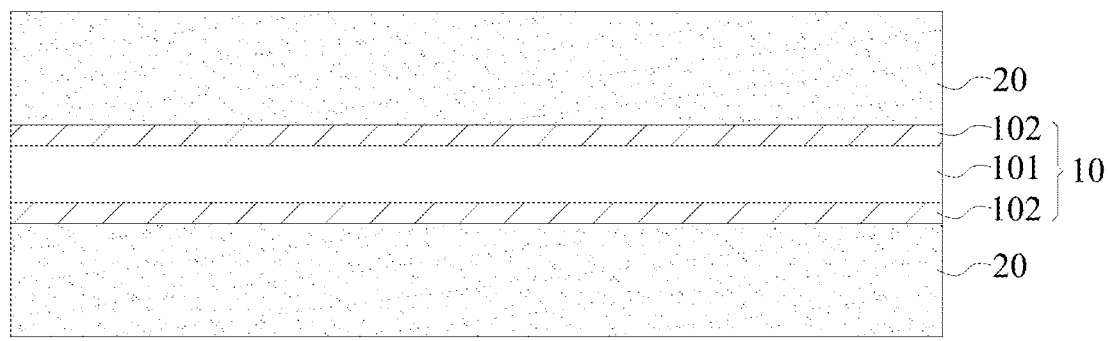
FIG. 3 is a schematic diagram of structure of a positive electrode plate according to an embodiment of the present application.
Figure 4:
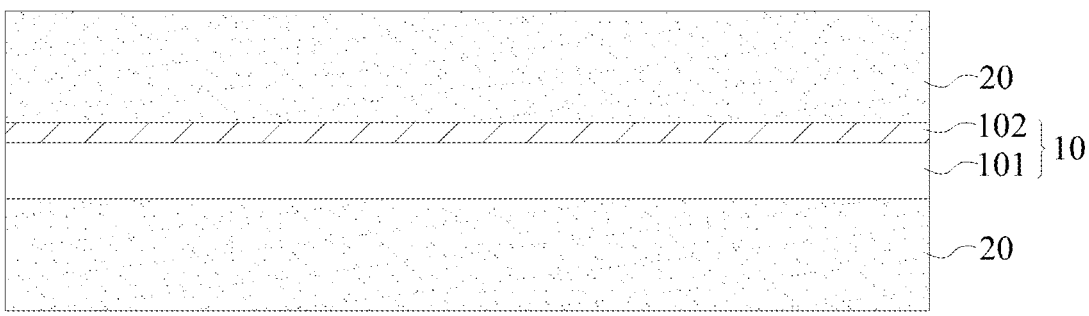
FIG. 4 is a schematic diagram of structure of a positive electrode plate according to another embodiment of the present application.

In some embodiments, referring to FIGS. 3 and 4, the positive electrode current collector 10 comprises two opposite surfaces in its thickness direction, and the positive electrode active material layer 20 is disposed on sides of the two opposite surfaces, wherein an overcharge blocking activation layer 102 is disposed between the positive electrode active material layer 20 on at least one side and the metal conductive layer 101. Preferably, as shown in FIG. 3, an overcharge blocking activation layer 102 is disposed between each of the positive electrode active material layers 20 on both sides and the metal conductive layer 101.

Figure 5:
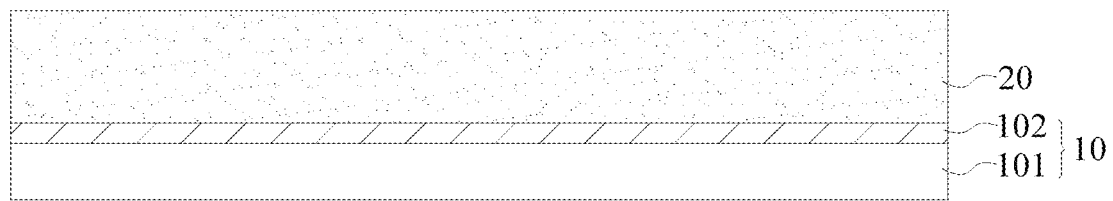
FIG. 5 is a schematic diagram of structure of a positive electrode plate according to yet another embodiment of the present application.

Apparently, in other embodiments, referring to FIG. 5, the metal conductive layer 101 of the positive electrode current collector 10 may comprise two opposite surfaces in its thickness direction, and an overcharge blocking activation layer 102 may be disposed on any one of the two opposite surfaces, and the positive electrode active material layer 20 may be disposed on surface of the overcharge blocking activation layer 102 facing away from the metal conductive layer 101.

In some embodiments, area of the overcharge blocking activation layer 102 is $S_1$, and area of the positive electrode active material layer 102 disposed on the surface of the overcharge blocking activation layer 102 facing away from the metal conductive layer 101 is $S_2$, and the area ratio is preferably $0.8 \leq S_1/S_2 \leq 1$, more preferably $0.98 \leq S_1/S_2 \leq 1$, and more preferably $0.99 \leq S_1/S_2 \leq 1$. The larger the area covered by the overcharge blocking activation layer 102 on the positive electrode active material layer 102 is, the more the overcharge safety performance of the electrochemical device can be improved.

The positive electrode active material layer 20 comprises a positive electrode active material, which may be a known positive electrode active material capable of reversibly intercalating/de-intercalating active ions in the art. The positive electrode active material is not limited in the present application.

For example, the positive electrode active material for lithium ion secondary batteries may comprise one or more of lithium transition metal composite oxides, composite oxides obtained by adding other transition metals or non-transition metals or non-metals in lithium transition metal composite oxides. The transition metal may be one or more of Mn, Fe, Ni, Co, Cr, Ti, Zn, V, Al, Zr, Ce and Mg.

As an example, the positive electrode active material may be selected from one or more of lithium cobalt oxide, lithium nickel oxide, lithium manganese oxide, lithium nickel manganese oxide, lithium nickel cobalt manganese oxide, lithium nickel cobalt aluminum oxide, and olivine structure li-contained phosphate; for example, one or more of $LiMn_2O_4$, $LiNiO_2$, $LiCoO_2$, $LiNi_{1-y}Co_yO_2$ (0<y<1), $LiNi_aCo_bAl_{1-a-b}O_2$ (0<a<1, 0<b<1, 0<a+b<1), $LiMn_{1-m-n}Ni_mCo_nO_2$ (0<m<1, 0<n<1, 0<m+n<1), $LiMPO_4$ (M may be one or more of Fe, Mn, and Co) and $Li_3V_2(PO_4)_3$. $LiMn_{1-m-n}Ni_mCo_nO_2$ is, for example, $LiMn_{0.1}Ni_{0.8}Co_{0.1}O_2$, $LiMn_{0.3}Ni_{0.5}Co_{0.2}O_2$, $LiMn_{0.2}Ni_{0.6}Co_{0.2}O_2$, $LiMn_{1/3}Ni_{1/3}Co_{1/3}O_2$.

Optionally, the positive electrode active material layer 20 may further comprise a binder. The type of binder is not limited in the embodiments of the present application. For example, the binder may be one or more of styrene-butadiene rubber (SBR), water-based acrylic resin, sodium carboxymethyl cellulose (CMC-Na), polyvinylidene fluoride (PVDF), polytetrafluoroethylene (PTFE), ethylene vinyl acetate copolymer (EVA), polyvinyl alcohol (PVA), and polyvinyl butyral (PVB).

Optionally, the positive electrode active material layer 20 further comprises a conductive agent. The type of the conductive agent is not limited in the embodiments of the present application. As an example, the conductive agent may be one or more of graphite, superconducting carbon, acetylene black, carbon black, Ketjen black, carbon dots, carbon nanotubes, graphene, and carbon nanofibers.

The positive electrode plate may be prepared according to conventional methods in the art. As an example, positive electrode active material, conductive agent, and binder are dispersed in a solvent to form a uniform positive electrode slurry. The solvent is, for example, N-methylpyrrolidone (NMP). Then the positive electrode slurry is coated on the positive electrode current collector 10. After procedures including drying, cold-pressing and the like, a positive electrode plate is obtained.

Electrochemical Device

Embodiments of the present application also provides an electrochemical device, comprising the positive electrode plate according to the embodiments of the present application, a separator and a negative electrode plate.

By using the positive electrode plate according to the embodiments of the present application, the electrochemical device of the embodiments of the present application thus also has the corresponding advantages, such as relatively high overcharge safety performance, more preferably further comprising other advantages as described above.

The electrochemical device may be a bare core or a battery containing a bare core and an electrolyte. The battery is, for example, a secondary battery (such as a lithium ion secondary battery, a sodium ion battery, a magnesium ion battery), a primary battery (such as a lithium primary battery), but it is not limited thereto.

The bare core may be a laminated structure formed by stacking a positive electrode plate, a separator, and a negative electrode plate in order, or may be a wound structure obtained by stacking a positive electrode plate, a separator, and a negative electrode plate in order and winding the stack. The separator is located between the positive electrode plate and the negative electrode plate for isolation.

In the bare core, the negative electrode plate may comprise a negative electrode current collector and a negative electrode active material layer disposed on at least one surface of the negative electrode current collector. For example, the negative electrode active material layer is disposed on either or both of the two opposite surfaces of the negative electrode current collector in the thickness direction of the negative electrode current collector.

The negative electrode active material layer can be a known negative electrode active material capable of reversibly intercalating/de-intercalating active ions in the art. The negative electrode active material is not limited in the present application.

For example, the negative electrode active material used for a lithium ion secondary battery may comprise one or more of metallic lithium, natural graphite, artificial graphite, mesophase microcarbon (abbreviated as MCMB), hard carbon, soft carbon, silicon, silicon-carbon composite, $SiO_x$ (0<x<2), Li—Sn alloy, Li—Sn—O alloy, Sn, SnO, $SnO_2$, spinel structure lithium titanate and Li—Al alloy.

Optionally, the negative electrode active material layer further comprises a binder. The type of binder is not limited in the embodiments of the present application. For example, the binder may be one or more of styrene-butadiene rubber (SBR), water-based acrylic resin, sodium carboxymethyl cellulose (CMC-Na), polyvinylidene fluoride (PVDF), polytetrafluoroethylene (PTFE), ethylene vinyl acetate copolymer (EVA), polyvinyl alcohol (PVA), and polyvinyl butyral (PVB).

Optionally, the negative electrode active material layer further comprises a conductive agent. The type of the conductive agent is not limited in the embodiments of the present application. As an example, the conductive agent may be one or more of graphite, superconducting carbon, acetylene black, carbon black, Ketjen black, carbon dots, carbon nanotubes, graphene, and carbon nanofibers.

The negative electrode plate may be prepared according to conventional methods in the art. As an example, negative electrode active material, conductive agent, and binder are dispersed in a solvent to form a uniform negative electrode slurry. The solvent is, for example, deionized water. Then the negative electrode slurry is coated on the negative electrode current collector. After procedures including drying, cold-pressing and the like, a negative electrode plate is obtained.

The type of separator is not particularly limited. The separator may be any well-known porous structural separator used for an electrochemical device, for example, one or more of single-layer or multi-layer composite film of glass fiber separator, non-woven fabric separator, polyethylene separator, polypropylene separator and polyvinylidene fluoride separator, but it is not limited thereto.

In the battery, the electrolyte can be a solid electrolyte or a non-aqueous electrolyte. There are no specific restrictions on their types and can be selected according to requirements.

As an example, a non-aqueous electrolyte comprises an organic solvent and an electrolyte salt.

For example, the organic solvent used in lithium ion secondary battery may be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethylsulfone (MSM), methylethylsulfone (EMS), and diethylsulfone (ESE), but it is not limited thereto.

For example, the electrolyte salt used in lithium ion secondary battery may be selected from one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bis(fluorosulfonyl)imide), LiTFSI (lithium bis(trifluoromethylsulfonyl)imide), LiTFS (lithium trifluoromethanesulfonate), LiDFOB (lithium difluoro(oxalato)borate), LiBOB (lithium bis(oxalato)borate), $LiPO_2F_2$ (lithium difluorophosphate), LiDFOP (lithium difluorobis(oxalato)phosphate), and LiTFOP (lithium tetrafluorooxalatophosphate), but it is not limited thereto.

The non-aqueous electrolyte may also optionally include additives that improve battery performance. There is no specific limitation on the type of additives, which can be selected according to requirements.

The core may be prepared according to methods known in the art. For example, the positive electrode plate, the separator and the negative electrode plate are laminated in order, so that the separator film is located between the positive electrode plate and the negative electrode plate for isolation, to give a core. It may also be further wound to give a core.

The battery may be prepared according to methods known in the art. For example, the core is placed in the outer package, and non-aqueous electrolyte is injected. After sealing, a battery is obtained.

Figure 6:
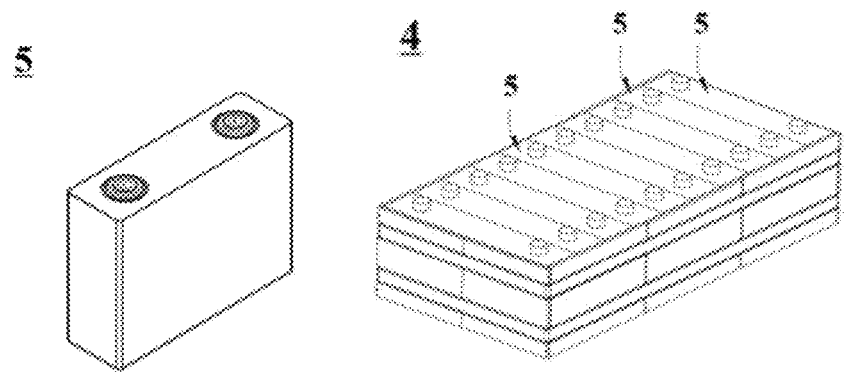
FIG. 6 is a schematic diagram of an embodiment of a lithium ion battery.

The present application has no particular limitation on the shape of the electrochemical device, which may be cylindrical, square or other arbitrary shapes. In some embodiments, as shown in FIG. 6, the electrochemical device is a secondary battery 5 with a square structure.

In some embodiments, the secondary battery 5 may comprise an outer package. The outer package is used to encapsulate the core and the electrolyte.

In some embodiments, the outer package of the secondary battery 5 may be a hard shell, such as a hard plastic shell, aluminum shell, steel shell. The outer package of the secondary battery 5 may also be a soft package, for example, a bag. The material of the soft package may be plastic, for example comprise one or more of polypropylene PP, polybutylene terephthalate PBT, and polybutylene succinate PBS.

Figure 7:
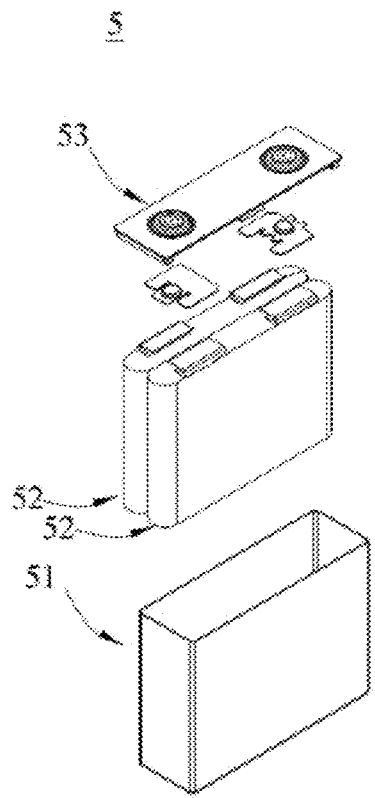
FIG. 7 is an exploded view of FIG. 6.

In some embodiments, referring to FIG. 7, the outer package may comprise a housing 51 and a cover plate 53. The housing 51 may comprise a bottom plate and a side plate connected to the bottom plate, and the bottom plate and the side plate enclose a receiving cavity. The housing 51 has an opening communicating with the receiving cavity, and the cover plate 53 can cover the opening to close the receiving cavity. The positive electrode plate, a negative electrode plate and a separator may be formed into a core 52 through a lamination process or a winding process. The core 52 is packaged in the receiving cavity. The electrolyte that can be an electrolytic solution is infiltrated in the core 52.

The number of cores 52 contained in the secondary battery 5 may be one or more, which can be adjusted according to requirements.

In some embodiments, the secondary battery may be assembled into a battery module. The number of secondary batteries contained in the battery module can be multiple, and the specific number can be adjusted according to the application and capacity of the battery module.

Figure 8:
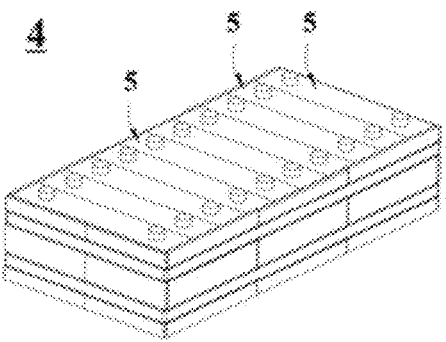
FIG. 8 is a schematic diagram of an embodiment of a battery module.

FIG. 8 is a battery module 4 as an example. Referring to FIG. 8, in the battery module 4, a plurality of secondary batteries 5 may be arranged in sequence along the length direction of the battery module 4. Apparently, it can also be arranged in any other manner. Further, the plurality of secondary batteries 5 may be fixed by fasteners.

Optionally, the battery module 4 may further comprise a housing with a receiving space, and a plurality of secondary batteries 5 are accommodated in the receiving space.

In some embodiments, the above-mentioned battery module may also be assembled into a battery pack. The number of battery modules contained in the battery pack can be adjusted according to the application and capacity of the battery pack.

Figure 9:
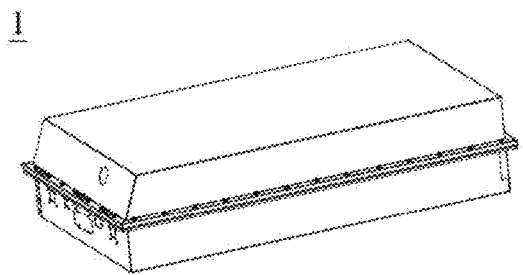
FIG. 9 is a schematic diagram of an embodiment of a battery pack.
Figure 10:
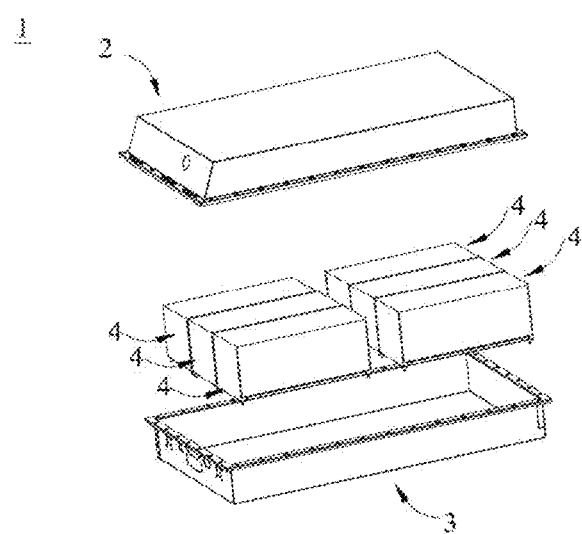
FIG. 10 is an exploded view of FIG. 9.

FIGS. 9 and 10 are the battery pack 1 as an example. Referring to FIGS. 9 and 10, the battery pack 1 may comprise a battery cabinet and a plurality of battery modules 4 provided in the battery cabinet. The battery cabinet comprises an upper cabinet 2 and a lower cabinet 3. The upper cabinet 2 can be covered on the lower cabinet 3 to form a closed space for accommodating the battery modules 4. The plurality of battery modules 4 may be arranged in the battery box in any manner.

Electric Equipment

Embodiments of the present application provide an electric equipment, comprising the electrochemical device as described in the present application. The electrochemical device may be used as a powder source of the electric equipment, and may also be used as an energy storage unit of the electric equipment. The electric equipment may be, but is not limited to, a mobile device (for example, a mobile phone or a notebook computer), an electric vehicle (for example, a full electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like. The electrochemical device, for example, a primary battery, a secondary battery, a battery module, or a battery pack, may be selected according to requirements for using the electric equipment.

Figure 11:
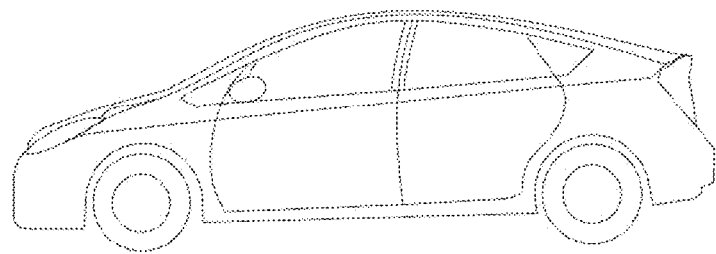
FIG. 11 is a schematic diagram of an embodiment of electric equipment using the lithium ion battery as a power supply.

FIG. 11 shows an example of electric equipment. The electric equipment is a full electric vehicle, a hybrid electric vehicle, a plug-in hybrid electric vehicle, or the like. To meet requirements of the electric equipment for high power and a high energy density of a electrochemical device, a battery pack or a battery module may be used.

In another example, the electric equipment may be a mobile phone, a tablet computer, a notebook computer, or the like. The electric equipment usually requires lightness and thinness, and a secondary battery may be used as a power source.

EXAMPLES

The following examples are intended to more specifically describe the content of the present application, and are intended to be illustrative only, because various modifications and changes in the scope of the present disclosure will be apparent to those skilled in the art. All parts, percentages, and ratios reported in the following examples are on weight basis unless otherwise stated, and all reagents used in the examples are commercially available or synthetically obtained by conventional methods and are directly used without further processing, and the instruments used in the examples are commercially available.

Example 1 (EX1)

Preparation of Positive Electrode Current Collector

Preparation of a slurry for an overcharge blocking activation layer: 53 parts by weight of polyvinylidene fluoride (PVDF), 7 parts of conductive carbon black (Super-P), 38 parts by weight of glucose pentaacetate, and 2 parts by weight of polyoxypropylene glycerol ether were placed in a planetary stirred tank. Then 900 parts by weight of N-methylpyrrolidone (NMP) were added as a dispersing solvent. After stirring quickly for 5 hours, a uniform and stable slurry was formed.

Preparation of positive electrode current collector: The uniform and stable slurry was vacuumed to remove bubbles, then applied on surfaces of metal conductive layer of aluminum foil on both sides with a gravure or micro gravure coater. After baking and drying, a uniform and dense overcharge blocking activation layer was formed, yielding a positive electrode current collector. The metal conductive layer of aluminum foil had a thickness of 12 μm, and the overcharge blocking activation layer on single side had a thickness of 3 μm.

Preparation of Positive Electrode Plate

A positive electrode active material $LiNi_{0.8}Co_{0.1}Mn_{0.1}O_2$, a conductive agent Super-P, a binder PVDF were dispersed at a weight ratio of 95:2:3 in a solvent NMP, to obtain a mixture. After stirring and mixing thoroughly, a positive electrode slurry was obtained. The positive electrode slurry was coated on two opposite surfaces of the positive electrode current collector. A positive electrode plate was obtained by drying and cold-pressing. On a single side of metal conductive layer, a ratio $S_1/S_2$ of surface area $S_1$ of overcharge blocking activation layer to surface area $S_1$ of positive electrode active material layer was 1. The coverage of the overcharge blocking activation layer on the positive electrode active material layer was 100%.

Preparation of Negative Electrode Plate

A negative electrode active material artificial graphite, a conductive agent Super-P, a binder styrene-butadiene rubber (SBR) and sodium carboxymethyl cellulose (CMC-Na) were dispersed at a weight ratio of 93:3:2:2 in deionized water as a solvent, to obtain a mixture. After stirring and mixing uniformly, a negative electrode slurry was obtained. Then the negative electrode slurry was coated on two opposite surfaces of the negative electrode current collector of copper foil. A negative electrode plate was obtained by drying and cold-pressing.

Preparation of Electrolyte

Ethylene carbonate (EC), propylene carbonate (PC) and dimethyl carbonate (DMC) were mixed uniformly in a mass ratio of 1:1:1 to obtain an organic solvent. Then, lithium salt $LiPF_6$ was dissolved in the above organic solvent. After mixing uniformly, an electrolyte having a $LiPF_6$ concentration of 1 mol/L was obtained.

Preparation of Lithium Ion Secondary Battery

The positive electrode plate, a porous polyethylene separator, and the negative electrode plate were stacked in order, and then wound to obtain a bare core. The bare core was placed in an outer package. The electrolyte was injected. After packaging, lithium ion secondary battery was obtained.

Example 2

Example 2 was different from Example 1 in that: 34 parts by weight of glucose-1,6-di(ethyl phosphate) were used as overcharge blocking activation material; 53 parts by weight of PVDF were used as a binder; 7 parts by weight of conductive carbon black (Super-P) and 1 parts by weight of carbon nanotubes (CNT) were used as conductive agent; and 3 parts by weight of vinyltrimethoxysilane and 2 parts by weight of polyoxypropylene glycerol ether were used as auxiliary material.

Example 3

Example 3 was different from Example 1 in that: 37 parts by weight of glucose-1,6-di(methyl phosphate) were used as overcharge blocking activation material; 52 parts by weight of PVDF were used as a binder; 5 parts by weight of Super-P and 1 parts by weight of CNT were used as conductive agent; and 3 parts by weight of vinyltrimethoxysilane and 2 parts by weight of polyoxypropylene glycerol ether were used as auxiliary material.

Example 4

Example 4 was different from Example 1 in that: 36 parts by weight of β-cyclodextrin acetate were used as overcharge blocking activation material; 52 parts by weight of PVDF were used as a binder; 7 parts by weight of Super-P were used as conductive agent; and 3 parts by weight of vinyltrimethoxysilane and 2 parts by weight of polyoxypropylene glycerol ether were used as auxiliary material.

Example 5

Example 5 was different from Example 4 in that: the overcharge blocking activation layer on each single side has a thickness of 2 μm.

Example 6

Example 6 was different from Example 1 in that: 36 parts by weight of β-cyclodextrin carbonate were used as overcharge blocking activation material; 52 parts by weight of PVDF were used as a binder; 7 parts by weight of Super-P were used as conductive agent; and 3 parts by weight of vinyltrimethoxysilane and 2 parts by weight of polyoxypropylene glycerol ether were used as auxiliary material.

Example 7

Example 7 was different from Example 6 in that: the overcharge blocking activation layer on each single side has a thickness of 5 μm.

Example 8

Example 8 was different from Example 1 in that: 36 parts by weight of β-cyclodextrin phosphate were used as overcharge blocking activation material; 52 parts by weight of PVDF were used as a binder; 7 parts by weight of Super-P were used as conductive agent; and 3 parts by weight of vinyltrimethoxysilane and 2 parts by weight of polyoxypropylene glycerol ether were used as auxiliary material.

Example 9

Example 9 was different from Example 8 in that: the overcharge blocking activation layer on each single side has a thickness of 7 μm.

Example 10

Example 10 was different from Example 1 in that: 35 parts by weight of cellulose methyl carbonate were used as overcharge blocking activation material; 50 parts by weight of SBR were used as a binder; 10 parts by weight of Super-P were used as conductive agent; 5 parts by weight of CMC-Na were used as auxiliary material; and deionized water was used as solvent for dispersion.

Example 11

Example 11 was different from Example 1 in that: 35 parts by weight of chitosan methyl carbonate were used as overcharge blocking activation material; 50 parts by weight of PVDF were used as a binder; 10 parts by weight of Super-P were used as conductive agent; 3 parts by weight of vinyltrimethoxysilane and 2 parts by weight of polyoxypropylene glycerol ether were used as auxiliary material.

Example 12

Example 12 was different from Example 1 in that: 40 parts by weight of cellulose methyl carbonate were used as overcharge blocking activation material; 50 parts by weight of PVDF were used as a binder; 8 parts by weight of Super-P and 2 parts by weight of CNT were used as conductive agent; no auxiliary material was used.

Example 13

Example 13 was different from Example 1 in that: 35 parts by weight of cellulose methyl carbonate were used as overcharge blocking activation material; 53 parts by weight of PAA were used as a binder; 7 parts by weight of Super-P were used as conductive agent; 3 parts by weight of vinyltrimethoxysilane and 2 parts by weight of polyoxypropylene glycerol ether were used as auxiliary material; deionized water was used as solvent for dispersion; and on a single side of metal conductive layer, a ratio $S_1/S_2$ of surface area $S_1$ of overcharge blocking activation layer to surface area $S_1$ of positive electrode active material layer was 98%.

Example 14

Example 14 was different from Example 1 in that: 35 parts by weight of cellulose methyl carbonate were used as overcharge blocking activation material; 53 parts by weight of PVDF were used as a binder; 5 parts by weight of Super-P and 2 parts by weight of CNT were used as conductive agent; 3 parts by weight of vinyltrimethoxysilane and 2 parts by weight of polyoxypropylene glycerol ether were used as auxiliary material; and the overcharge blocking activation layer on each single side has a thickness of 0.5 μm.

Example 15

Example 15 was different from Example 1 in that: 35 parts by weight of cellulose methyl carbonate were used as overcharge blocking activation material; 53 parts by weight of PVDF were used as a binder; 7 parts by weight of Super-P were used as conductive agent; and 3 parts by weight of vinyltrimethoxysilane and 2 parts by weight of polyoxypropylene glycerol ether were used as auxiliary material.

Example 16

Example 16 was different from Example 5 in that: the slurry for overcharge blocking activation layer was applied on surface of metal conductive layer of aluminum foil on single side, and after baking and drying, a uniform and dense overcharge blocking activation layer was formed, yielding a positive electrode current collector; the metal conductive layer of aluminum foil had a thickness of 12 μm, and the overcharge blocking activation layer had a thickness of 10 μm.

Example 17

Example 17 was different from Example 1 in that: 35 parts by weight of cellulose methyl carbonate were used as overcharge blocking activation material; 53 parts by weight of PVDF were used as a binder; 5 parts by weight of Super-P and 2 parts by weight of CNT were used as conductive agent; 3 parts by weight of vinyltrimethoxysilane and 2 parts by weight of polyoxypropylene glycerol ether were used as auxiliary material; and $LiCoO_2$ was used as positive electrode active material.

Comparative Example 1 (CE1)

Comparative Example 1 was different from Example 1 in that: aluminum foil having a thickness of 12 μm was used as a positive electrode current collector, without an overcharge blocking activation layer.

Comparative Example 2

Comparative Example 2 was different from Example 1 in that: a positive electrode current collector comprises a conductive layer of aluminum foil having a thickness of 12 μm and coatings disposed on two opposite surfaces of the conductive layer of aluminum foil; and slurry for coatings was prepared as follows: 5 parts by weight of CMC-Na, 85 parts by weight of SBR, and 10 parts by weight of Super-P were placed in a planetary stirred tank, then 900 parts by weight of deionized water were added as a dispersing solvent, and after stirring quickly for 5 hours, a uniform and stable slurry was formed. Other steps were the same as those in Example 1.

Comparative Example 3

Comparative Example 3 was different from Example 1 in that: a positive electrode current collector comprises a conductive layer of aluminum foil having a thickness of 12 μm and coatings disposed on two opposite surfaces of the conductive layer of aluminum foil; and slurry for coatings was prepared as follows: 90 parts by weight of PAA and 10 parts by weight of SBR were placed in a planetary stirred tank, then 900 parts by weight of deionized water were added as a dispersing solvent, and after stirring quickly for 5 hours, a uniform and stable slurry was formed. Other steps were the same as those in Example 1.

Comparative Example 4

Comparative Example 4 was different from Example 1 in that: a positive electrode current collector comprises a conductive layer of aluminum foil having a thickness of 12 μm and coatings disposed on two opposite surfaces of the conductive layer of aluminum foil; and slurry for coatings was prepared as follows: 90 parts by weight of PVDF and 10 parts by weight of Super-P were placed in a planetary stirred tank, then 900 parts by weight of NMP were added as a dispersing solvent, and after stirring quickly for 5 hours, a uniform and stable slurry was formed. Other steps were the same as those in Example 1.

Comparative Example 5

Comparative Example 5 was different from Example 17 in that: aluminum foil having a thickness of 12 μm was used as a positive electrode current collector, without an overcharge blocking activation layer.

Comparative Example 6

Comparative Example 6 was different from Example 17 in that: a positive electrode current collector comprises a conductive layer of aluminum foil having a thickness of 12 μm and coatings disposed on two opposite surfaces of the conductive layer of aluminum foil; and slurry for coatings was prepared as follows: 90 parts by weight of PVDF and 10 parts by weight of Super-P were placed in a planetary stirred tank, then 900 parts by weight of NMP were added as a dispersing solvent, and after stirring quickly for 5 hours, a uniform and stable slurry was formed. Other steps were the same as those in Example 14.

Test Section (1) Test of Overcharge Safety Performance of Lithium Ion Secondary Battery At 25±2° C., the lithium ion secondary battery was charged at a constant current rate of 0.1 C to 4.25V, and then charged at a constant voltage to a current of 0.05 C, and was left for 30 minutes. Then, the battery was fixed with a clamp and placed on overcharge safety testing equipment. At the ambient temperature controlled at 25±2° C., the battery was left for 5 minutes. Then, fully charged battery was charged at a constant current rate of 1 C. real-time voltage and temperature changes were record for each battery, until the battery cached fire or exploded or the charging step was stopped. For each of Examples and Comparative Examples, 10 batteries were taken for testing. If a battery did not catch fire or exploded, the battery passed the test; otherwise, it failed the test.

(2) Test of Cycle Performance of Lithium Ion Secondary Battery

At 25±2° C., the lithium ion secondary battery was charged at a constant current rate of 0.1 C to 4.25V, and then charged at a constant voltage to a current of 0.05 C, and was left for 5 minutes, then discharged at a constant current of 1 C until a voltage of 2.8 was reached. This was regarded as a charge/discharge cycle process, and the obtained discharge capacity at this time was the discharge capacity at the first cycle. The lithium ion secondary battery was subjected to charge/discharge test according to the foregoing method for 100 cycles, to record the discharge capacity values for each cycle.

Capacity retention rate (%)=(the discharge capacity at the 100th cycle/the discharge capacity of the lithium ion battery at the first cycle)×100%.

The test results of Examples 1-17 (EX1-EX17) and Comparative Examples 1-6 (CE1-CE6) were shown in the Table 1 below.

TABLE 1

|  | Pass rate in test of overcharge safety performance | Capacity retention rate at 100 cycles (%) |
|---|---|---|
| Example 1 | 7/10 | 91.3 |
| Example 2 | 9/10 | 91.5 |
| Example 3 | 10/10 | 91.1 |
| Example 4 | 8/10 | 93.7 |
| Example 5 | 7/10 | 94.0 |
| Example 6 | 10/10 | 93.6 |
| Example 7 | 10/10 | 92.8 |
| Example 8 | 10/10 | 93.8 |
| Example 9 | 10/10 | 91.9 |
| Example 10 | 10/10 | 94.2 |
| Example 11 | 10/10 | 94.5 |
| Example 12 | 6/10 | 94.1 |
| Example 13 | 8/10 | 94.6 |
| Example 14 | 5/10 | 94.7 |
| Example 15 | 10/10 | 94.3 |
| Example 16 | 10/10 | 94.3 |
| Example 17 | 10/10 | 93.9 |
| Comparative Example 1 | 0/10 | 94.8 |
| Comparative Example 2 | 0/10 | 94.5 |
| Comparative Example 3 | 0/10 | 94.7 |
| Comparative Example 4 | 0/10 | 94.4 |
| Comparative Example 5 | 0/10 | 94.3 |
| Comparative Example 6 | 0/10 | 95.1 |

Figure 12:
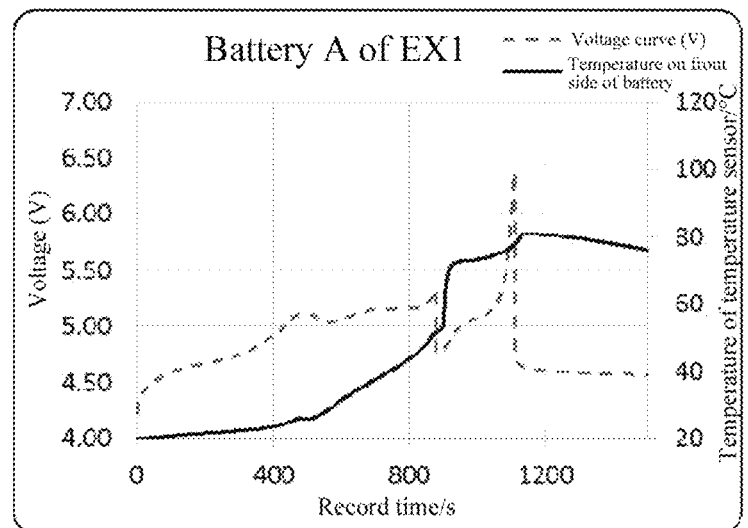
FIG. 12 is a graph of voltage-temperature-time of the lithium ion secondary battery of Example 1.
Figure 13:
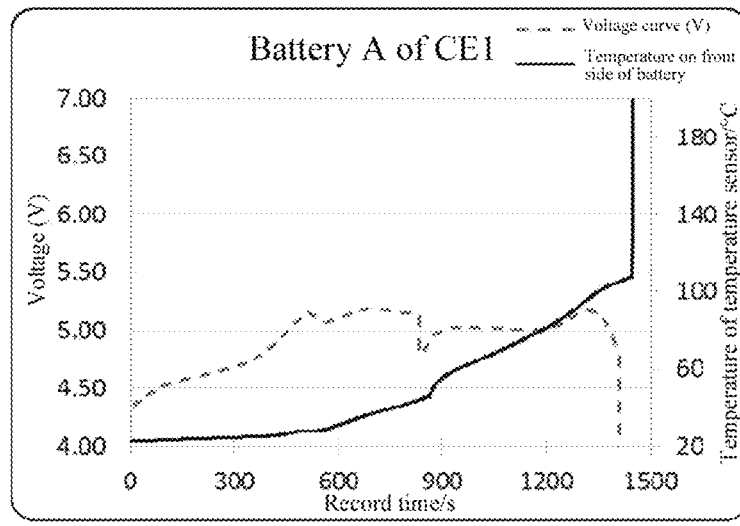
FIG. 13 is a graph of voltage-temperature-time of the lithium ion secondary battery of Comparative Example 1.

FIG. 13 is a graph of voltage-temperature-time of the lithium ion secondary battery of Comparative Example 1. When the battery in Comparative Example 1 was overcharged, the battery temperature rose sharply, and the battery failed due to thermal s runaway, causing fire and explosion and thus safety risks. FIG. 12 is a graph of voltage-temperature-time of the lithium ion secondary battery of Example 1. When the battery in Example 1 was overcharged, the overcharge blocking activation layer rapidly responded and cut off external charging current and suppressed the increase of the battery temperature, thereby significantly improving the overcharge safety performance of the battery. From comparison between FIG. 12 and FIG. 13, it can be seen that the overcharge safety performance of the lithium ion secondary battery is significantly improved by disposing an overcharge blocking activation layer in positive electrode current collector.

From the comparisons of Examples 1-16 with Comparative Examples 1-4 as well as Example 17 with Comparative Examples 5-6 in Table 1, it can be seen that in case a battery is overcharged, the overcharge blocking activation layer can cut off external charging current in time by disposing an overcharge blocking activation layer in positive electrode current collector, so that the overcharge safety performance of the battery is significantly improved; in addition, cycle performance of lithium ion secondary battery that is charged and discharged under normal circumstances is not significantly influenced, so that a relatively high capacity retention rate is maintained.

From the results of Examples 12 as well as Examples 13 and 15, it can be seen that by further adding auxiliary material, the overcharge safety performance of the battery can be better improved by the overcharge blocking activation layer.

The above mentioned descriptions only show particular implementations of the present application and but are not intended to limit the protection scope of the present application. Any equivalent modification or replacement readily figured out by a person skilled in the art within the technical scope disclosed in the present application shall fall within the protection scope of the present application. Therefore, the protection scope of the present application shall be determined by the protection scope of the claims.

What is claimed is:

1. A positive electrode current collector, comprising:
a metal conductive layer;
an overcharge blocking activation layer disposed on a surface of the metal conductive layer, the overcharge blocking activation layer comprising an overcharge blocking activation material, a binder material and a conductive material, wherein the overcharge blocking activation material comprises an esterified saccharide,
wherein the esterified saccharide comprises one or more of glucose pentaacetate, glucose-1,6-di(ethyl phosphate), glucose-1,6-di(methyl carbonate), β-cyclodextrin acetate, β-cyclodextrin carbonate, β-cyclodextrin phosphate, cellulose methyl carbonate, cellulose ethyl carbonate, cellulose methyl phosphate, cellulose ethyl phosphate, chitosan methyl carbonate, chitosan ethyl carbonate, chitosan methyl phosphate, and chitosan ethyl phosphate.

2. The positive electrode current collector according to claim 1, wherein
in the overcharge blocking activation layer, mass percentage of the overcharge blocking activation material is from 25% to 45%, mass percentage of the binder material is from 35% to 60%, and mass percentage of the conductive material is from 6% to 20%.

3. The positive electrode current collector according to claim 1, wherein the overcharge blocking activation layer further comprises auxiliary materials comprising one or more of sodium carboxymethyl cellulose, silane coupling agents, titanate coupling agents, organopolysiloxanes, higher alcohol fatty acid ester complex, polyoxyethylene polyoxypropylene pentaerythritol ether, polyoxyethylene polyoxypropanol amine ether, polyoxypropylene glycerol ether and polyoxypropylene polyoxyethylene glycerol ether.

4. The positive electrode current collector according to claim 3, wherein in the overcharge blocking activation layer, mass percentage of the auxiliary materials is from 1 to 10%.

5. The positive electrode current collector according to claim 1, wherein the overcharge blocking activation layer is disposed on one single surface of the metal conductive layer, and the overcharge blocking activation layer has a thickness of from 0.3 μm to 10 μm; and/or
the overcharge blocking activation layer is disposed on both of two opposite surfaces of the metal conductive layer, and total thickness of the overcharge blocking activation layer on both surfaces of the metal conductive layer is from 0.5 μm to 18 μm, and the overcharge blocking activation layer has a thickness on each surface of greater than or equal to 0.25 μm.

6. The positive electrode current collector according to claim 1, wherein the binder comprises one or more of polyvinylidene fluoride, vinylidene fluoride-hexafluoropropylene copolymer, polyurethane, polyacrylonitrile, polyimide, epoxy resin, organic silicone resin, ethylene-vinyl acetate copolymer, styrene-butadiene rubber, styrene-acrylic rubber, polyacrylic acid, acrylic acid-acrylate copolymer, and ethylene-acrylate copolymer; and/or
the conductive material comprises one or more of metal conductive materials, carbon-based conductive materials, and conductive polymer materials.

7. A positive electrode plate, comprising:
the positive electrode current collector according to claim 1; and
a positive electrode active material layer disposed on surface of the overcharge blocking activation layer of the positive electrode current collector facing away from the metal conductive layer.

8. The positive electrode plate according to claim 7, wherein a ratio of surface area of the overcharge blocking activation layer to surface area of the positive electrode active material layer on same surface of the metal conductive layer is from 80% to 100%.

9. An electrochemical device, comprising the positive electrode plate according to claim 7, a negative electrode plate and a separator.

10. An electric equipment, comprising the electrochemical device according to claim 9.

11. The positive electrode current collector according to claim 1, wherein the saccharide comprises one or more of glucose, cellulose, chitosan, and cyclodextrin.

12. The positive electrode current collector according to claim 1, wherein the mass percentage of the overcharge blocking activation material is from 30% to 40%, the mass percentage of the binder material is from 45% to 55%, and the mass percentage of the conductive material is from 6% to 10%.

13. The positive electrode current collector according to claim 3, wherein in the overcharge blocking activation layer, mass percentage of the auxiliary materials is from 2% to 8%.

14. The positive electrode current collector according to claim 6, wherein the metal conductive materials comprise one or more of aluminum, aluminum alloy, copper, copper alloy, nickel, nickel alloy, titanium, and silver.

15. The positive electrode current collector according to claim 6, wherein the carbon-based conductive materials comprise one or more of Ketjen black, mesophase carbon microspheres, activated carbon, graphite, conductive carbon black, acetylene black, carbon fiber, carbon nanotube, and grapheme.

16. The positive electrode current collector according to claim 6, wherein the conductive polymer materials comprise one or more of polysulfur nitrides, aliphatic conjugated polymers, aromatic ring conjugated polymers, and aromatic heterocyclic conjugated polymers.

17. The positive electrode plate according to claim 7, wherein a ratio of surface area of the overcharge blocking activation layer to surface area of the positive electrode active material layer on same surface of the metal conductive layer is from 98% to 100%.

* * * * *